United States Patent
Benoit et al.

(10) Patent No.: US 10,259,068 B2
(45) Date of Patent: Apr. 16, 2019

(54) ALUMINIUM/COPPER HETEROGENEOUS WELDING

(71) Applicants: CENTRE NATIONAL DE LA RECHERCHE SCIENTIFIQUE, Paris (FR); UNIVERSITE DE NANTES, Nantes (FR)

(72) Inventors: Alexandre Benoit, Nantes (FR); Donald Schleich, Nantes (FR); Pascal Paillard, Ligne (FR); Thierry Baudin, Gif sur Yvette (FR)

(73) Assignees: CENTRE NATIONAL DE LA RECHERCHE SCIENTIFIQUE, Paris (FR); UNIVERSITE DE NANTES, Nantes (FR)

( * ) Notice: Subject to any disclaimer, the term of this patent is extended or adjusted under 35 U.S.C. 154(b) by 184 days.

(21) Appl. No.: 14/443,681

(22) PCT Filed: Oct. 31, 2013

(86) PCT No.: PCT/EP2013/072817
§ 371 (c)(1),
(2) Date: May 19, 2015

(87) PCT Pub. No.: WO2014/075933
PCT Pub. Date: May 22, 2014

(65) Prior Publication Data
US 2015/0298242 A1  Oct. 22, 2015

(30) Foreign Application Priority Data
Nov. 19, 2012  (FR) .................................... 12 60984

(51) Int. Cl.
*B23K 9/00* (2006.01)
*B23K 9/16* (2006.01)
(Continued)

(52) U.S. Cl.
CPC ............ *B23K 9/232* (2013.01); *B23K 9/0035* (2013.01); *B23K 9/095* (2013.01); *B23K 9/16* (2013.01);
(Continued)

(58) Field of Classification Search
CPC ............ B23K 2203/10; B23K 2203/12; B23K 2203/18; B23K 37/0408; B23K 9/0035;
(Continued)

(56) References Cited

U.S. PATENT DOCUMENTS 2,790,656 A * 4/1957 Cook .................... B23K 9/232
174/94 R
2,916,815 A * 12/1959 Donkervoort ........ B23K 35/286
228/262.5
(Continued)

FOREIGN PATENT DOCUMENTS

DE   719 215       4/1942
WO   2006/125234 A1   11/2006

OTHER PUBLICATIONS

French Search Report dated Sep. 6, 2013, in corresponding French priority application.
(Continued)

*Primary Examiner* — Dana Ross
*Assistant Examiner* — Joe E Mills, Jr.
(74) *Attorney, Agent, or Firm* — Young & Thompson

(57) ABSTRACT

Method of assembling a first thin copper part and a second thin aluminum part, each to be welded using heterogeneous welding, includes placing the ends of the parts so that they face one another and pressing the ends against one another so as to constitute a welding zone extending therebetween; and applying an aluminum alloy by way of filler metal to the welding zone using a low energy welding method in which the electric arc and the meltable filler wire are wider than the
(Continued)

combined thickness of the parts, the parts being held so as to maintain the welding zone at the top using a fixing element including at least two rigid blocks of a conductive material whose thickness is between 1 and 2 mm, whose length is greater than that of the parts and whose width is sufficient to hold the parts, and a pressure fixing system.

13 Claims, 3 Drawing Sheets

(51) Int. Cl.
| | | |
|---|---|---|
| B23K 9/23 | (2006.01) | |
| H01M 2/26 | (2006.01) | |
| B23K 37/04 | (2006.01) | |
| B23K 9/095 | (2006.01) | |
| B23K 103/10 | (2006.01) | |
| B23K 103/12 | (2006.01) | |
| B23K 103/18 | (2006.01) | |

(52) U.S. Cl.
CPC .......... *B23K 37/0408* (2013.01); *H01M 2/26* (2013.01); *B23K 2103/10* (2018.08); *B23K 2103/12* (2018.08); *B23K 2103/18* (2018.08)

(58) Field of Classification Search
CPC .......... B23K 9/095; B23K 9/16; B23K 9/232; H01M 2/26
USPC .................................. 219/137 R, 74
See application file for complete search history.

(56) References Cited

U.S. PATENT DOCUMENTS

| | | | | | |
|---|---|---|---|---|---|
| 3,795,786 | A * | 3/1974 | Chanowitz | ........... | B23K 9/0035 219/121.11 |
| 5,452,838 | A * | 9/1995 | Farassat | ................. | B23K 20/10 228/1.1 |
| 6,316,125 | B1 * | 11/2001 | Gaman | ................ | B23K 35/286 148/23 |
| 6,337,453 | B1 * | 1/2002 | Miller | .................. | B23K 9/0035 219/56.21 |
| 7,241,970 | B2 * | 7/2007 | Fortain | .................. | B23K 9/173 219/129 |
| 7,677,430 | B2 * | 3/2010 | Watanabe | .............. | B21K 25/00 228/115 |
| 2003/0189082 | A1 * | 10/2003 | Dockus | ................ | B23K 35/002 228/56.3 |
| 2004/0222200 | A1 * | 11/2004 | Bonnet | ................ | B23K 1/0012 219/121.14 |
| 2010/0012638 | A1 * | 1/2010 | Fortain | .................. | B23K 9/167 219/137 R |
| 2010/0285352 | A1 * | 11/2010 | Juzkow | ................... | H01M 2/26 429/163 |
| 2011/0117420 | A1 * | 5/2011 | Kim | ...................... | B23K 9/0026 429/158 |
| 2011/0195296 | A1 * | 8/2011 | Kim | ....................... | B23K 26/32 429/151 |
| 2011/0248007 | A1 * | 10/2011 | Takeda | .................. | B23K 9/092 219/130.51 |
| 2012/0187738 | A1 * | 7/2012 | Gross | ..................... | B21D 26/14 297/452.1 |
| 2013/0122345 | A1 * | 5/2013 | Sato | ...................... | H01M 2/202 429/121 |

OTHER PUBLICATIONS

International Search Report dated Mar. 25, 2014, in corresponding PCT application.

* cited by examiner

ALUMINIUM/COPPER HETEROGENEOUS WELDING

A subject of the invention is a method for welding thin parts made of copper with thin parts made of aluminium and the use of this method for manufacturing batteries, in particular electrical accumulator batteries used in shipping and transport.

Welding is a permanent assembly technique which establishes a natural continuity between the welded parts. The weld can thus be the result of a mixture of the base materials and potentially of a filler product.

The main problems linked to the assembling of thin parts are: the removal of excess heat, the deformation of the parts and the necessary precision: positioning and squeeze of the parts.

Generally, welding methods generate a quantity of heat such that the pool may collapse during the welding of parts of small thickness; moreover, the smaller the thickness, the greater the deformations.

In gas-shielded MIG/MAG (Metal Inert Gas/Metal Active Gas) welding methods, or arc welding with meltable wire gas-shielded with an inert gas/arc welding with meltable wire gas-shielded with an active gas) the energy necessary for the formation of a pool is obtained with an electric arc, established between a wire-electrode and the parts to be welded. A consumable welding wire and a shielding gas are fed through a welding torch. The welding wire is held close to or in contact with a metal welding surface so that an electric arc is obtained between said welding wire and said metal surface. The electric arc causes the liquefaction of the end of the welding wire which is then applied to the welding surface. An inert or semi-inert gas is blown around the welding wire in order to limit contaminants close to the weld. These methods involve the heating of the welding surface to temperatures which cause significant undesirable changes, such as hardening and warping. Thus low-energy welding methods have been developed, in particular by the company Fronius which has developed an electric arc method for assembling steel and aluminium based on MIG/MAG welding; this method, called MIG CMT (Metal Inert Gas Cold Metal Transfer), makes it possible to reduce the heat generated on the welding surface. It is described in international application WO 2006/125234 and is based on deliberate and systematic activation of the heating arc followed by its deactivation, so as to systematically heat the welding wire and cool it down again while bringing the wire into and out of contact with the molten pool at a rapid frequency. This method allows a very low-energy controlled transfer of material and makes it possible to assemble, by welding, thin sheets made of aluminium and steel, materials which are known to be incompatible.

In fact, electric arc welding of metals the melting temperature, the coefficient of expansion or the electrochemical potential of which are very different is practically impossible. Thus, it is impossible to weld aluminium to copper with techniques which involve the melting of one of the parts as their melting temperatures differ by approximately 600° C. Aluminium-copper joints are therefore produced by brazing, by electric resistance welding or by friction (solid phase welding). However brazing involves placing the two parts in a furnace and is less solid, electric welding requires joint preparations which are impossible to carry out in certain applications, in particular the manufacture of batteries, and friction welding involves mechanical stresses and does not make it possible to weld sheets the thickness of which is a few tenths of a millimeter. These techniques are moreover restrictive and time-consuming.

Electrical energy is playing an increasingly important role in vehicles for a large number of applications. In the field of light vehicles, this increase in importance relates to equipment (safety, comfort, support, communication) or motorization with the current development of hybrid electric-internal combustion engine vehicles as well as the more recent development of a new generation of purely electric vehicles. In the field of urban transport vehicles, where electrification is very widespread (trolleybuses, tracked transport), novel solutions relating to the partial autonomy or the smoothing of power demand, are being implemented. A common feature of these technological innovations is that they involve on-board energy storage systems, in particular lithium-ion batteries. Generally, these batteries are manufactured by a mechanical assembly of different cells, which increases the weight and final bulk of the assembly.

There is therefore a need to have a method for assembling battery cells available which makes it possible to reduce the weight and the final bulk of the batteries while retaining their vibration-resistance ability.

The purpose of the present invention is therefore to make available a method for assembling battery cells which makes it possible to reduce the weight and the final bulk of the batteries while retaining their vibration-resistance ability.

A subject of the invention is therefore a method for assembling a first thin part to be welded made of copper and a second thin part to be welded made of aluminium, said parts having a thickness of less than 1 mm and said method comprising a stage consisting of arranging the ends of said parts to be assembled so that they face one another and pressing said ends against one another, so as to constitute a welding zone extending along a welding zone (or line) between the parts; and arranging an aluminium alloy as a filler metal in said welding zone by a low-energy welding method in which the electric arc and the meltable filler wire are wider than the combined thickness of the parts, said parts being held in such a way as to keep the welding zone uppermost, using a fixing means comprising:

a) at least two rigid blocks of a conductive material the thickness of which is comprised between 1 and 2 mm, the length of which is greater than that of the parts to be welded and the width of which is sufficient to hold said parts and b) a pressure fixing system allowing the blocks to be held against the parts.

Low-energy welding methods are known and make it possible to weld more quickly, with less energy and virtually without projections. By way of examples, the conventional short-circuit MIG-MAG variant, the EWM (EWM HIGH-TEC WELDING) Cold Arc MIG-MAG variant and the CMT (Cold Metal Transfer) method as described in the application WO 2006/125234 may be mentioned.

The material used for the blocks can be any thermally conductive material, or any thermally and electrically conductive material known to a person skilled in the art; advantageously the melting temperature of said material is greater than or equal to that of copper and of aluminium. They are moreover inert with respect to the parts to be welded, i.e. the type of material used for the blocks must not react with the material of the parts to be welded. By way of example of the metals, in particular steel, aluminium, copper and alloys thereof such as brass may be mentioned.

The two blocks constitute a tool which performs four roles. The first consists of holding the parts, in particular the sheets, in position during the operation. The second is maintenance of the molten pool in case of too much melting. The third is electrical, ensuring in this application the earth clamp of the method, i.e., the electrical return necessary for formation of the arc. This third role can also be performed by external means. The last role is thermal, storing the surplus heat during the operation and limiting the extent of the molten zone. There are advantageously two rigid sheets, preferably made of aluminium, the width of which must be sufficient to ensure the rigidity and holding of the pieces or parts to be welded. A pressure fastening system makes it possible to clamp the assembly and dismantle it easily.

The pressure fixing system can be any known system, arranged in order to hold the parts to be welded. The relative position of the parts to be welded is insignificant and a person skilled in the art will be able to position them according to the type of parts to be welded and the materiel used.

The meltable filler wire is constituted by an aluminium alloy, a material which is well known to a person skilled in the art and commercially available. By way of example the alloy Al—Mg 5356 or 4043(Al-If) may be mentioned.

According to the invention, the deposition of the aluminium alloy can be repeated several times if necessary in order to consolidate the assembly. Thus, the deposition can be repeated 2, 3 or 4 times.

According to the invention, by thin part to be welded is meant any component made of copper or aluminium, irrespective of shape, the only requirement being that the thickness of the part to be assembled is less than 1 mm, advantageously comprised between 0.5 and 1 mm, even more advantageously between 0.1 and 0.5 mm.

In an advantageous embodiment of the method of assembly by heterogeneous welding according to the invention, the meltable filler wire is brought vertically or obliquely downwards onto the welding zone, at a rate comprised between 1 and 5 m/min, advantageously equal to 2 m/min, in the electric arc. The selection of the rate of the filler wire is determined by the rate of feed of the electric arc and a person skilled in the art will be able to select the suitable rate.

In another advantageous embodiment of the method of the invention, the electric arc is produced by a MIG welding torch which moves along the welding zone.

According to the invention, useable MIG welding torches are commercially available and a person skilled in the art will be able to select the one that suits him.

In another advantageous embodiment of the invention, the MIG welding torch utilizes an inert gas, in particular argon, pure or in a mixture with helium.

In another advantageous embodiment of the invention, the thin parts to be welded are sheets the thickness of which is less than 1 mm, advantageously comprised between 0.5 and 1 mm, even more advantageously between 0.1 and 0.5 mm.

According to the invention, the terms sheets, foils, strips, plates, tabs and panels are equivalent, provided that their thickness is less than 1 mm.

In another advantageous embodiment of the invention the thin parts to be welded are the electrode tabs of battery cells.

The method can be implemented manually or controlled by robot. A person skilled in the art will be able to select appropriate means of control or automation from those which are commercially available.

A subject of the invention is also a device comprising means arranged for implementing the welding method as defined previously.

A subject of the invention is also a method for manufacturing or connecting an individual cell for a battery characterized in that the electrically conductive connection is produced by a method of heterogeneous welding as described previously.

The use of the MIG CMT method contributes to reproducibility and operates with low welding energy, which is ideal for the welding of thin sheets. The MIG CMT welding operation takes only 2 or 3 seconds depending on the length of the welding zone of the electrodes to be welded and preserves the rest of the cell which is heat-sensitive.

The invention is illustrated by FIGS. 1 to 3 and the example below.

Other features and advantages of the invention will become apparent from the detailed description of an embodiment which is in no way limitative, and the attached drawings in which.

Figure 1A:
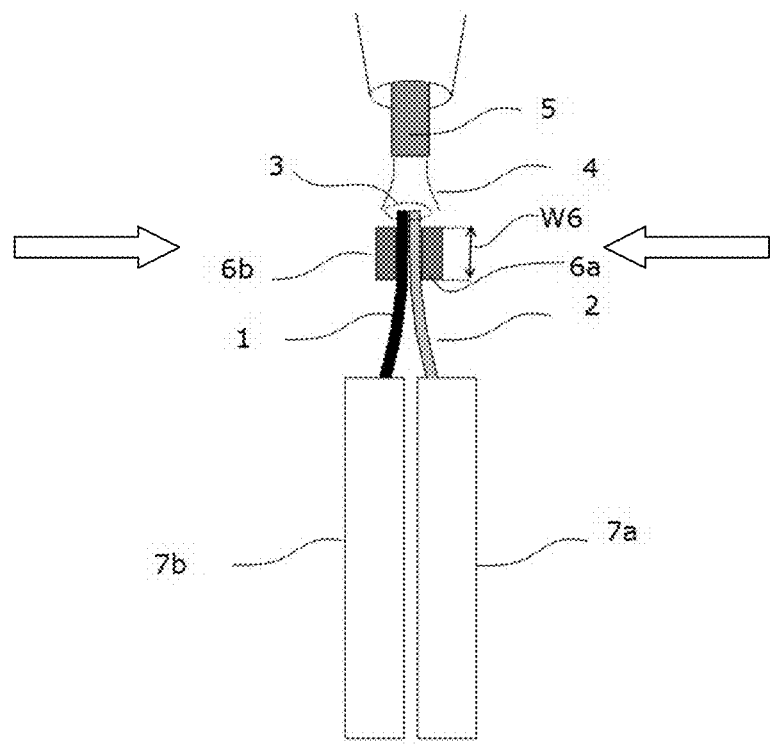
FIGS. 1a and 1b are respectively side view and top view diagrams which illustrate an embodiment example of the invention applied to the welding of electrode tabs of the cells of an electrical accumulator battery.
Figure 1B:
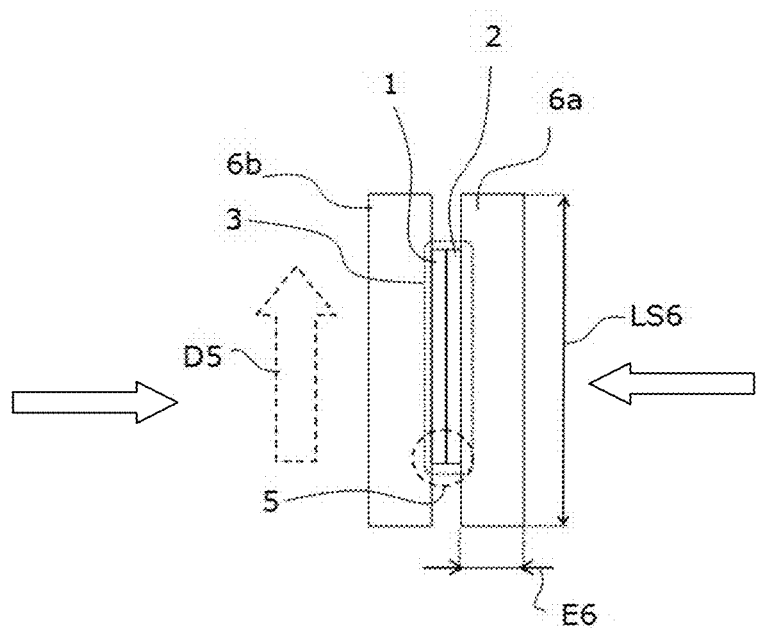
Figure 2:
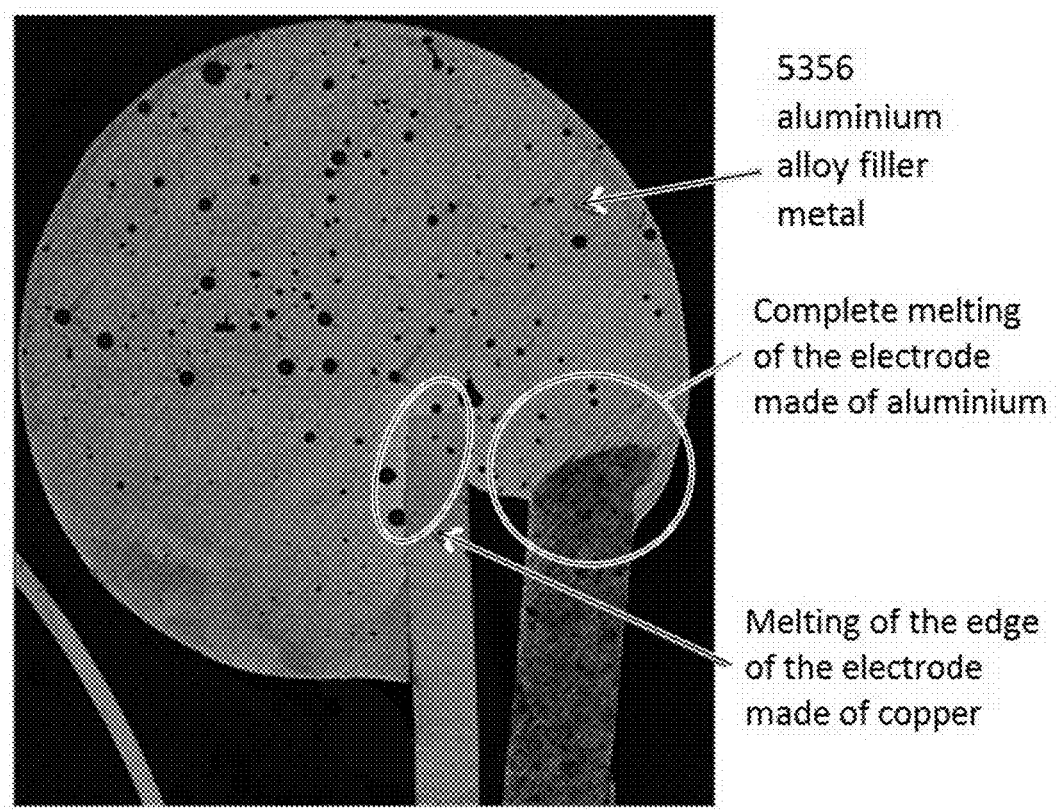
FIG. 2 is a photo representing a cross-section of the welded zone produced in the example of FIG. 1 between the aluminium and the copper of the two welded electrodes.

FIGS. 1a and 1b respectively represent a side view and a top view diagram of an assembly according to the invention, applied to the welding of electrode tabs of the cells of an electrical accumulator battery (7a, 7b). The welding of a first tab (1) made of copper and of a second tab (2) made of aluminium, said tabs having a thickness of less than 1 mm, is carried out in a position towards the bottom. The tabs are paired and held in a vertical position during the welding operation by a tool formed by blocks (6a, 6b). The welding is carried out on the edge of the sheets. The ends of the tabs (1, 2) to be assembled are pressed against one another, so as to constitute a welding zone (3) extending along a welding zone (or line) between the tabs (1, 2) and to deposit an aluminium alloy as a filler metal in said welding zone (3) by a low-energy welding method in which the electric arc (4) and the meltable filler wire (5) are wider than the combined thickness of the tabs (1, 2); because of this, the welding speed is high and the feeding of the filler wire is low with respect to the usual MIG/MAG welding standards. The rate of movement of the torch, and therefore of the electric arc and of the filler wire, is illustrated by the arrow (D5). The tabs (1, 2) are held in a vertical position with the ends to be welded directed towards the top during the welding operation, using a fixing means comprising two rigid blocks made of a conductive material (6a, 6b) the thickness of which (E6) is comprised between 1 and 2 mm, the length of which (LS6) is greater than that of the tabs to be welded (1, 2) and the width of which (W6) is sufficient to hold said tabs (1, 2); a pressure fixing system (represented schematically by arrows in the figures) makes it possible to hold the blocks (6a, 6b) against the parts (1, 2).

Figure 3:
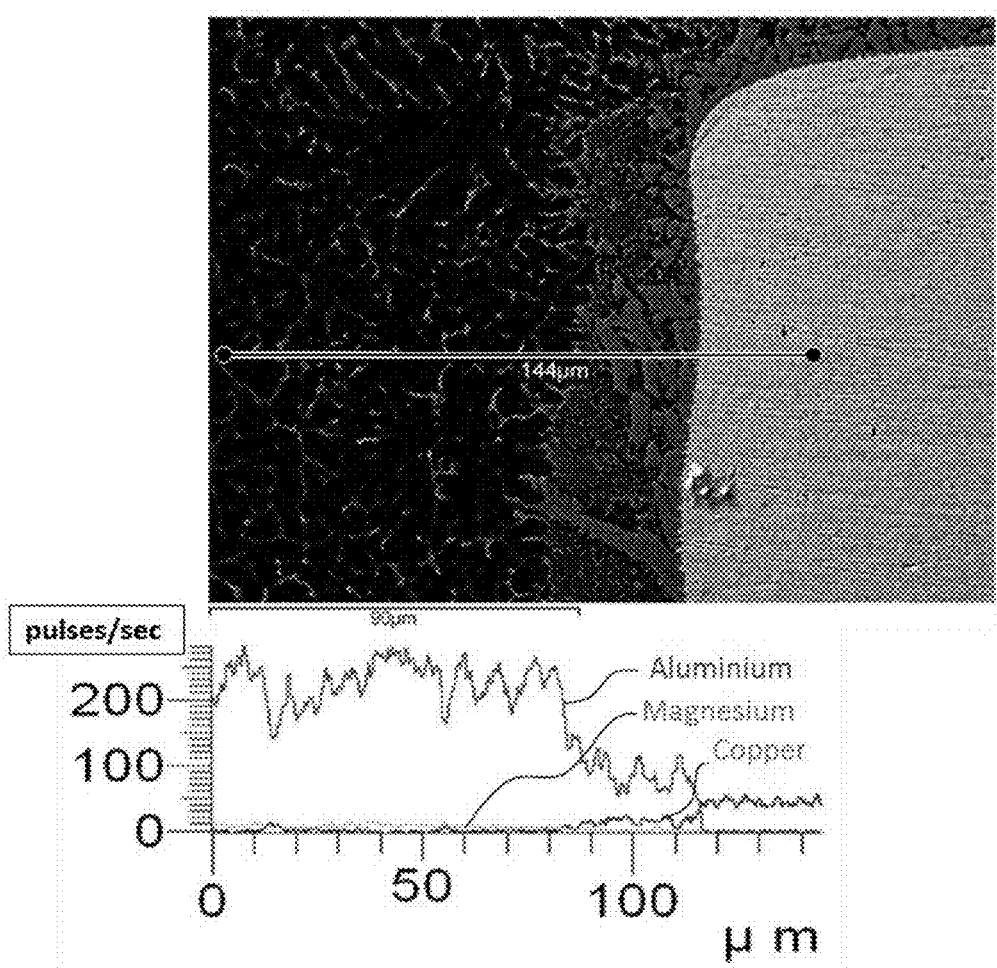
FIG. 3 is a photo illustrating a detail of FIG. 2, in a region including the interface between the parts of copper and of aluminium, associated with a graph representing the proportions of the different metals present along the axis shown in the figure.

The graph in FIG. 3 illustrates the melting of the copper and of the aluminium. In the zone from 0 to 90 µm there is the aluminium-magnesium alloy 5356, in the zone from 90 to 115 µm there is an aluminium alloy-magnesium/copper mixture and beyond 115 µm there is only copper.

EXAMPLE: ASSEMBLY BY WELDING OF BATTERY CELLS

1.1 Procedure

The electrodes are paired and held using the blocks. The latter are clamped using a tool. The assembly is placed so as to ensure welding in a flat position (torch towards the bottom). The electrical return (earth) is connected. The welding takes place. Then, the electrical earth is disconnected and the blocks are removed.

1.2 Tests

The batteries have been mechanically stressed (vibrations) during a prolonged test.

They equipped an electric wheelchair for twelve months without failing. This test shows the resistance of the welds to stresses (vibrations) and the satisfactory operation of the cell assembly.

The invention claimed is:

1. A method of assembly by Metal Inert Gas Cold Metal Transfer of a first thin part made of copper (1) and a second thin part made of aluminum (2) to be welded together using heterogeneous welding, each of said first and second thin parts having an uppermost end face, said uppermost end face extending along a thickness of each respective part, said thickness being less than 1 mm and said method comprising:
    a stage of arranging the uppermost end faces of said first and second thin parts (1, 2) to be assembled so that each of the uppermost end faces each face a meltable filler wire and pressing said ends against one another, so as to constitute a welding zone (3) extending along a line extending between the uppermost end face of the first thin part (1) and the uppermost end face of the second thin part (2); and
    arranging an aluminum alloy as a filler metal in said welding zone (3) by a Metal Inert Gas Cold Metal Transfer welding in which the electric arc (4) and the meltable filler wire (5) are each wider than the combined thickness of the first and second thin parts (1, 2),
    said first and second thin parts (1, 2) being held in such a way as to maintain the welding zone uppermost using a fixing means comprising:
    a) at least two rigid blocks of a conductive material (6a, 6b) the thickness of which is comprised between 1 and 2 mm, the length of which is greater than that of the first and second thin parts to be welded (1, 2) and the width of which is sufficient to hold said first and second thin parts (1, 2) and
    b) a pressure fixing system allowing the blocks (6a, 6b) to be held against the first and second thin parts (1, 2),
    wherein during the Metal Inert Gas Cold Metal Transfer welding, the meltable filler wire (5) and the electric arc (4) are brought down vertically or obliquely onto the welding zone,
    wherein during the Metal Inert Gas Cold Metal Transfer welding, the width of the at least two rigid blocks press on outside surfaces of the first and second thin parts (1, 2), and
    wherein a lengthwise end of each of the at least two rigid blocks extends beyond a corresponding end of the first and second thin parts (1, 2) in the welding zone (3) to provide a pool area for maintenance of a molten pool filler metal above the corresponding ends of the first and second thin parts (1, 2) during the Metal Inert Gas Cold Metal Transfer welding.

2. The method of assembly by heterogeneous welding according to claim 1, wherein the meltable filler wire (5) and the electric arc (4) are brought vertically or obliquely downwards onto the welding zone, at a rate comprised between 1 and 5 m/min.

3. The method of assembly by heterogeneous welding according to claim 1, wherein the MIG torch utilizes an inert gas comprising argon.

4. The method of assembly by heterogeneous welding according to claim 1, wherein the first and second thin parts (1, 2) are sheets, the thickness of which is less than 1 mm.

5. The method of assembly by heterogeneous welding according to claim 1, wherein the first and second thin parts (1, 2) are electrode tabs of battery cells (7a, 7b).

6. The method of assembly by heterogeneous welding according to claim 1, wherein the method is controlled by a robot.

7. The method of manufacture of an individual cell for a battery, wherein the electrically conductive connection is produced by a method of heterogeneous welding according to claim 1.

8. A method of assembly of a first thin part made of copper (1) and a second thin part made of aluminum (2) to be welded together using heterogeneous welding, said first and second thin parts (1, 2) each having an uppermost end face extending along a thickness of each respective part, said thickness being less than 1 mm and a length, said method comprising:
    arranging each of the uppermost end faces of said first and second thin parts (1, 2) facing a meltable filler wire, facing one another, and pressing outside surfaces of said ends against one another so as to constitute a welding zone (3) extending between the uppermost end faces of the first and second thin parts (1, 2); and
    while holding the first and second thin parts (1, 2) together at the welding zone (3) by positioning a width of two rigid blocks of a conductive material (6a, 6b) pressing on the outside surfaces of the first and second thin parts (1, 2) and along a length of the welding zone (3) to maintain the welding zone uppermost and arranging an aluminum alloy as a filler metal over said welding zone (3) during Metal Inert Gas Cold Metal Transfer welding in which an electric arc (4) and the meltable filler wire (5) are each wider than a combined thickness of the first and second thin parts (1, 2), said first and second thin parts (1, 2) being held by the two rigid blocks of a conductive material (6a, 6b) in such a way as to maintain the welding zone uppermost,
    wherein during the Metal Inert Gas Cold Metal Transfer welding, the meltable filler wire (5) and the electric arc (4) are brought down vertically or obliquely onto the welding zone, at a rate comprised between 1 and 5 m/min, and
    wherein a length of the two rigid blocks of the conductive material (6a, 6b) along the outside surfaces of the first and second thin parts (1, 2) is greater than the length of the first and second thin parts (1, 2) in the welding zone (3) such that each lengthwise end of each of the two rigid blocks extends beyond a corresponding end of the first and second thin parts (1, 2) in the welding zone (3) to create a pool area for maintenance of a molten pool filler metal above the corresponding ends of the first and second thin parts (1, 2) during the Metal Inert Gas Cold Metal Transfer welding,
    wherein the first and second thin parts (1, 2) are electrode tabs of battery cells (7a, 7b), and
    wherein a thickness of the two rigid blocks of a conductive material (6a, 6b) is comprised between 1 and 2 mm.

9. The method of assembly by heterogeneous welding according to claim 8, wherein the welding uses a MIG torch with an inert gas comprising argon.

10. The method of assembly by heterogeneous welding according to claim 1, wherein the first and second thin parts (1, 2) are sheets the thickness of which comprised between 0.5 and 1 mm.

11. The method of assembly by heterogeneous welding according to claim 8, wherein the method is controlled by a robot.

12. The method of manufacture of an individual cell for a battery, wherein the electrically conductive connection is produced by a method of heterogeneous welding according to claim 8.

13. The method of assembly by heterogeneous welding according to claim 1, wherein the first and second thin parts (1, 2) are sheets the thickness of which comprised between 0.1 and 0.5 mm.

* * * * *